(12) United States Patent
Tanaka (10) Patent No.: US 6,892,101 B2
(45) Date of Patent: May 10, 2005

(54) FEEDBACK CONTROL METHOD AND FEEDBACK CONTROL APPARATUS

(75) Inventor: Masato Tanaka, Tokyo (JP)

(73) Assignee: Yamatake Corporation, Tokyo (JP)

( * ) Notice: Subject to any disclaimer, the term of this patent is extended or adjusted under 35 U.S.C. 154(b) by 172 days.

(21) Appl. No.: 10/339,613

(22) Filed: Jan. 9, 2003

(65) Prior Publication Data

US 2003/0137332 A1 Jul. 24, 2003

(30) Foreign Application Priority Data

Jan. 10, 2002 (JP) ........................................ 2002-003848

(51) Int. Cl.[7] ............................................. G05B 13/02
(52) U.S. Cl. .............................. 700/46; 700/37; 700/42; 700/45; 700/47; 700/55; 700/72; 318/561
(58) Field of Search ................................ 700/28, 29, 32, 700/37, 40–47, 52, 54, 55, 71–74; 318/561, 611; 324/76.79, 76.81; 73/35.05; 702/188, 189

(56) References Cited

U.S. PATENT DOCUMENTS

| 4,882,526 | A | * | 11/1989 | Iino et al. .................... | 318/561 |
| 5,153,807 | A | * | 10/1992 | Saito et al. .................... | 700/45 |
| 5,245,528 | A | * | 9/1993 | Saito et al. .................... | 700/41 |
| 5,420,785 | A | * | 5/1995 | Shinskey ....................... | 700/37 |
| 5,566,065 | A | * | 10/1996 | Hansen et al. ................. | 700/44 |
| 5,848,535 | A | * | 12/1998 | Sibik ............................. | 62/99 |
| 6,754,542 | B1 | * | 6/2004 | Tanaka ......................... | 700/42 |

* cited by examiner

*Primary Examiner*—Anthony Knight
*Assistant Examiner*—Crystal J Barnes
(74) *Attorney, Agent, or Firm*—Blakely Sokoloff Taylor & Zafman (57) ABSTRACT

According to a feedback control method, the response process of set point tracking control is divided into three, tracking, convergence, and stabilization phases. The phase is switched to the tracking phase at set point change start time as the tracking phase start time. The manipulated variable which causes the controlled variable to tracking the set point is continuously output in the tracking phase. The phase is switched to the convergence phase at, as the convergence phase start time, specific set point tracking control elapsed time at which the controlled variable does not exceed the set point in the tracking phase. A manipulated variable which converges the controlled variable to the vicinity of the set point is continuously output in the convergence phase. The phase is switched to the stabilization phase at, as the stabilization phase start time, time at which the controlled variable reaches a preset situation in the convergence phase. A manipulated variable which stabilizes the controlled variable at the set point is continuously output in the stabilization phase. A feedback control apparatus is also disclosed.

18 Claims, 11 Drawing Sheets

FEEDBACK CONTROL METHOD AND FEEDBACK CONTROL APPARATUS

BACKGROUND OF THE INVENTION

The present invention relates to a process control technique and, more particularly, to a feedback control method and feedback control apparatus which perform set point tracking (follow-up) control by giving a manipulated variable to an object to be controlled such that the controlled variable tracks the set point.

PID control has conventionally been known as a highly practical general-purpose control theory. SAC (Simple Adaptive Control) is also known as an advanced control theory like the modern control theory. In either control theory, a manipulated variable MV is output as a control calculation result to an object to be controlled such that a controlled variable PV tracks a set point SP. The controlled variable PV is measured, and control calculation is performed based on a deviation Er from the set point SP.

General PID control is a linear control theory, and is a control theory which assumes that a control system including an object to be controlled is a linear system. An actual object to be controlled does not have strict linearity, and slight nonlinearity is permitted for PID control. Heating using a halogen lamp in RTP (Rapid Thermal Process) in a semiconductor manufacturing apparatus is executed by a highly nonlinear system to which PID control cannot be simply applied. In this case, even PID control can cope with tracking the stability of the control system. However, PID control cannot meet a condition under which high-speed temperature rise like RTP and a response waveform almost free from overshoot are required.

Figure 14:
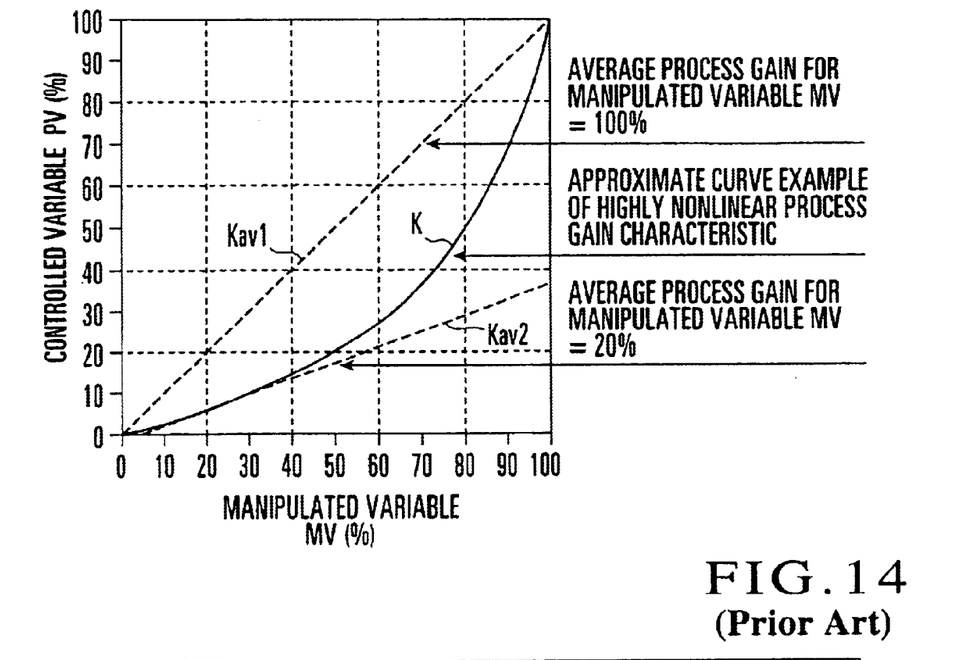
FIG. 14 is a graph showing a process gain characteristic of a highly nonlinear system.

Assume that the nonlinearity of the control system can be approximated by a characteristic K in FIG. 14. If the temperature is increased at a high speed following the step change of the set point SP (step response), the manipulated variable MV (heating output) reaches 100% at a large deviation Er between the set point SP and the controlled variable PV. The average process gain characteristic changes to a characteristic Kav1 with a steep slope in FIG. 14. As the temperature rises and the deviation Er decreases, the manipulated variable MV drops to about 20%. Along with this, the average process gain characteristic changes to another characteristic Kav2 with a moderate slope in FIG. 14.

Figure 15:
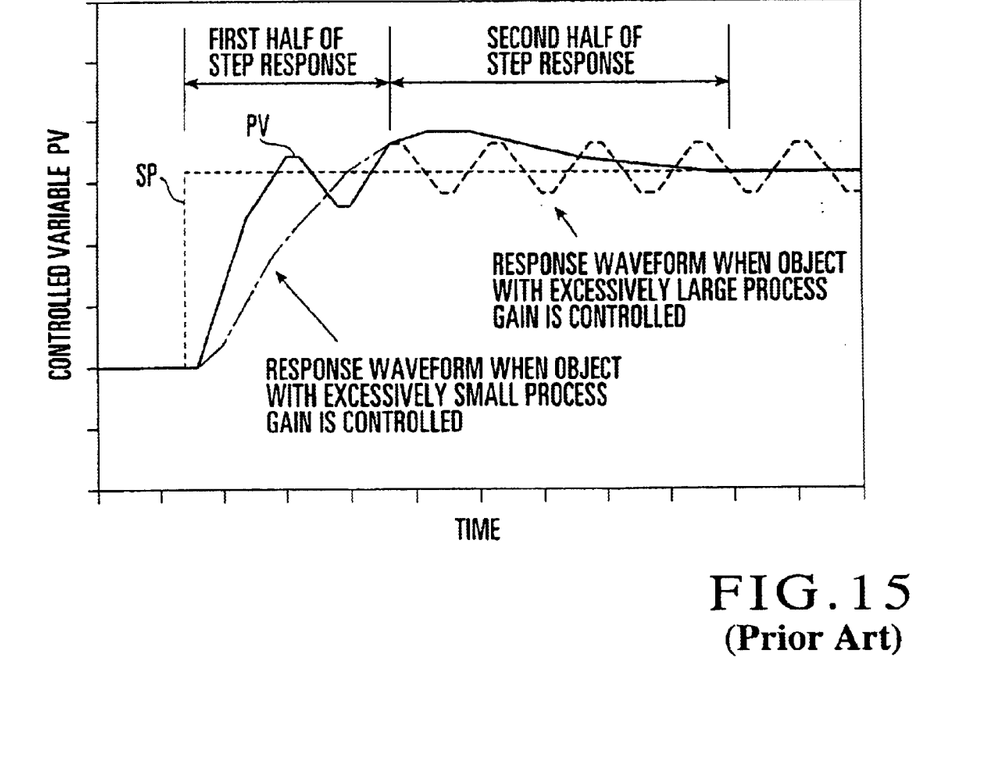
FIG. 15 is a graph showing a step response of the highly nonlinear system by PID control.

The PID parameters of a PID controller are adjusted in accordance with the high-speed temperature rise specifications, and the PID controller controls the temperature of a highly nonlinear system like the system in FIG. 14. The temperature rise locus (step response waveform) exhibits a characteristic PV in FIG. 15 with respect to the step change of the set point SP. More specifically, overshoot which controls an object with a large process gain occurs in the controlled variable PV in the first half of response. The second half of response suffers control operation in which tracking of the controlled variable PV for controlling an object with an excessively small process gain to the set point SP is extremely slow. The temperature rise locus as shown in FIG. 15 can be attained, but an object such as a semiconductor manufacturing apparatus which requires a response waveform almost free from overshoot is not properly controlled. Adjustment of the PID parameters is not defined by the linear control theory, and it is very difficult to adjust them.

Figure 16A:
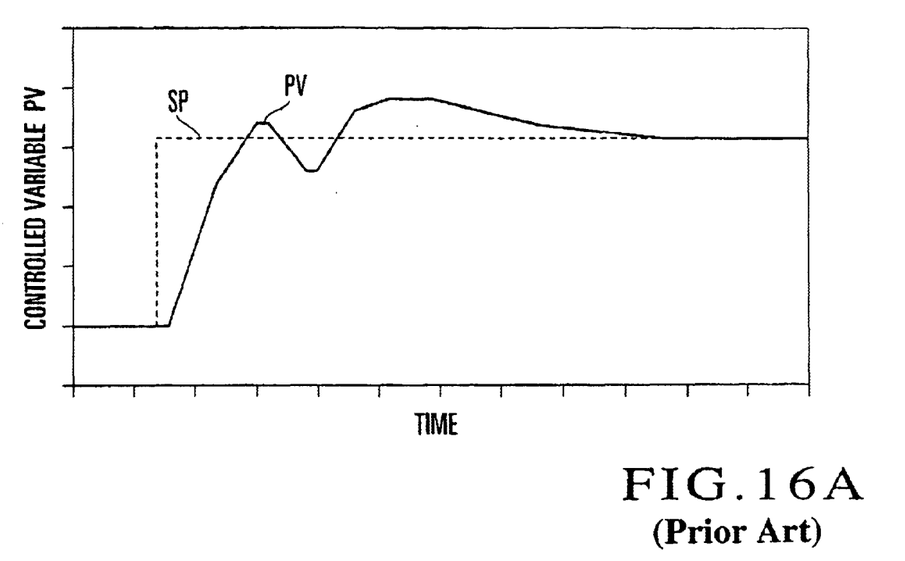
FIGS. 16A and 16B are waveform charts for explaining the problem of an advanced adaptive control theory such as SAC (Simple Adaptive Control).

An advanced adaptive control theory such as SAC is so designed as to automatically correct the internal parameters of a control calculation unit and always obtain a proper control characteristic with respect to variations in the process gain characteristic of an object to be controlled. For appropriate automatic correction (adaptive operation) of the internal parameters, control calculation must be executed a satisfactory number of times in the transient state. In high-speed temperature rise, the time necessary for temperature rise is about 1.0 to 1.5 sec, as shown in FIG 16A. For a control cycle of 50 msec, the control calculation count in the step response is about 20 to 30.

Figure 16B:
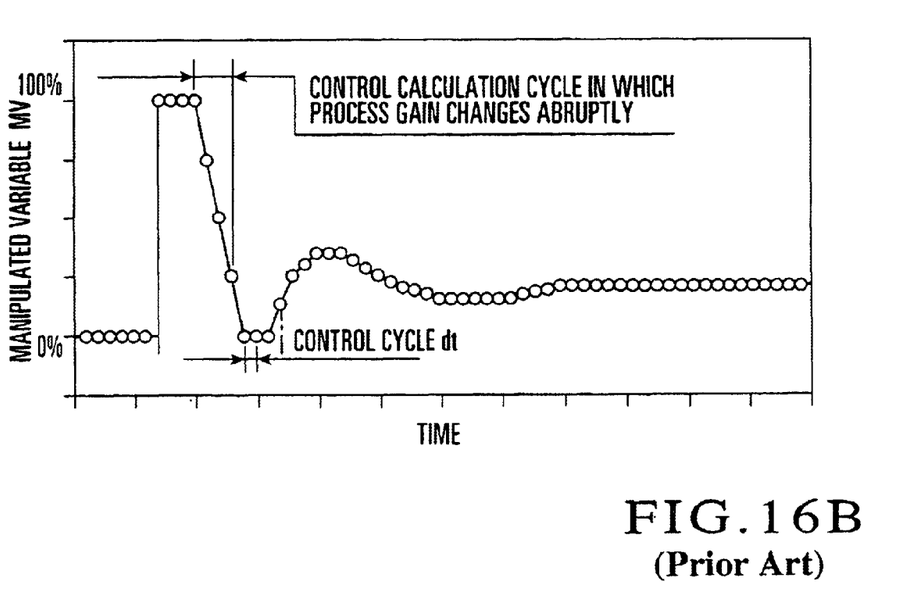

Under this condition, the control calculation count set to tracking a process gain change caused by the highly non-linear characteristic is two or three at most, as shown in FIG. 16B. This control calculation count is insufficient to execute adaptive operation. In practical use, a method based on the advanced adaptive control theory can finally obtain the control stability at most, and cannot smoothly increase at a high speed the temperature of a highly nonlinear object to be controlled. This theory is substantially a technique for merely ensuring the stability regardless of high-speed temperature rise. As for many parameters which should be set in advance for proper adaptive operation, there is no practical use standard regarding settings.

As described above, when a highly nonlinear system is to be controlled, the conventional PID control theory cannot realize proper set point tracking control, and it is also difficult to adjust PID parameters.

In the advanced adaptive control theory such as SAC, the control calculation count is insufficient to execute adaptive operation when the controlled variable of a highly nonlinear object is made to tracking the set point at a high speed. Appropriate set point tracking control cannot be realized, and it is also difficult to adjust parameters.

SUMMARY OF THE INVENTION

The present invention has been made to overcome the conventional drawbacks, and has as its object to provide a feedback control method and feedback control apparatus which can realize proper set point tracking control and easily adjust parameters for proper set point tracking control even when controlling a highly nonlinear system.

To achieve the above object, according to the present invention, there is provided a feedback control method of giving a manipulated variable to an object to be controlled so as to make a controlled variable tracking a set point, and performing the set point tracking control, comprising dividing a response process of set point tracking control into three, tracking, convergence, and stabilization phases, and executing a first phase switching procedure of switching a phase to the tracking phase at set point change start time as start time of the tracking phase, a tracking phase manipulated variable decision procedure of continuously outputting the manipulated variable which causes the controlled variable to tracking the set point in the tracking phase, a second phase switching procedure of switching the phase to the convergence phase at, as start time of the convergence phase, specific set point tracking control elapsed time at which the controlled variable does not exceed the set point in the tracking phase, a convergence phase manipulated variable decision procedure of continuously outputting a manipulated variable which converges the controlled variable to the vicinity of the set point in the convergence phase, a third phase switching procedure of switching the phase to the stabilization phase at, as start time of the stabilization phase, time at which the controlled variable reaches a preset situation in the convergence phase, and a stabilization phase manipulated variable decision procedure of continuously outputting a manipulated variable which stabilizes the controlled variable at the set point in the stabilization phase.

DESCRIPTION OF THE PREFERRED EMBODIMENTS

[First Embodiment]

The first embodiment of the present invention will be described in detail below with reference to the accompanying drawings. In the present invention, the response process of set point tracking control along with the change of the set point is divided into the following three phases (tracking, convergence, and stabilization phases). Each phase is assigned an appropriate, simple manipulated variable output sequence. The response waveform of set point tracking control is forcibly, directly shaped by a combination of a series of phases.

Figure 1A:
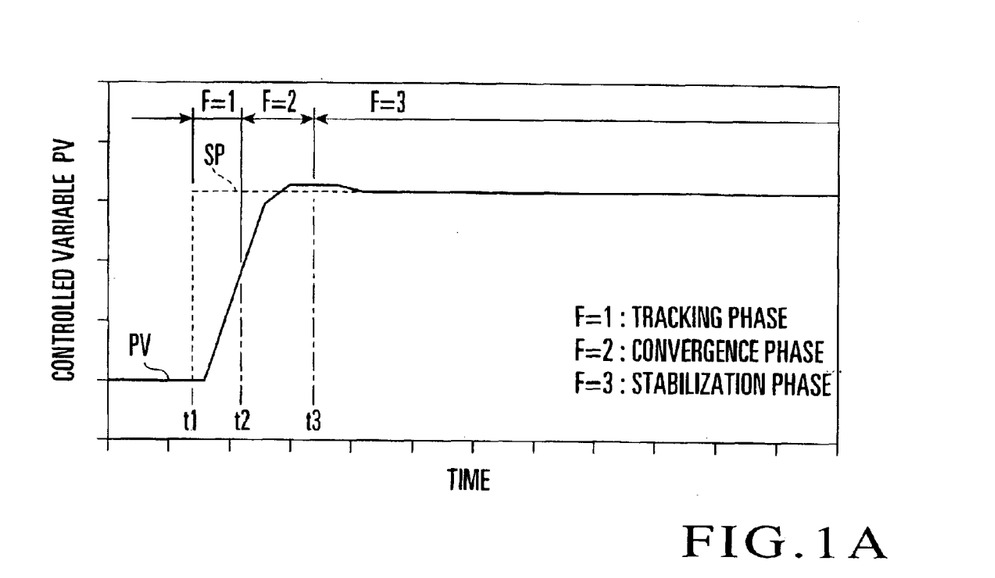
FIGS. 1A and 1B are waveform charts for explaining tracking, convergence, and stabilization phases in the present invention.
Figure 1B:
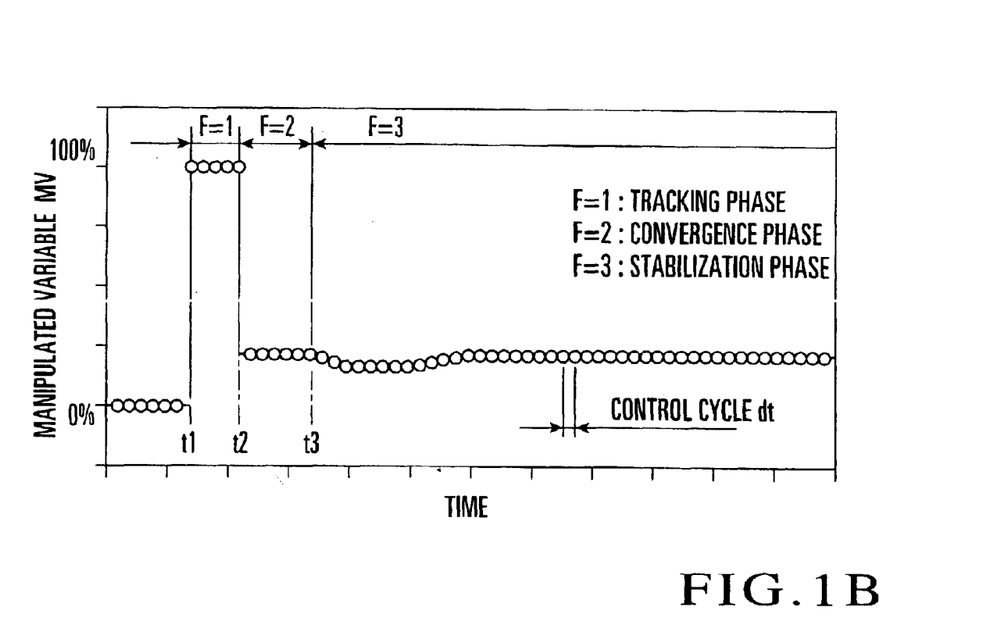

FIGS. 1A and 1B show the tracking phase, convergence phase, and stabilization phase in the present invention. FIG. 1A shows the change (response waveform) of the controlled variable PV, and FIG. 1B shows the change of the manipulated variable MV. In the response process, the tracking phase ranges from set point SP change start time t1 to specific set point tracking control elapsed time t2 at which the controlled variable PV does not exceed the set point SP. In the tracking phase, a manipulated variable MV with which the response waveform of set point tracking control is not disturbed and the controlled variable PV tracks the set point SP is continuously output.

The convergence phase ranges from the specific set point tracking control elapsed time t2 to time t3 at which the controlled variable reaches a situation designated in advance. In the convergence phase, a manipulated variable MV with which the response waveform of set point tracking control is not disturbed and the controlled variable PV converges to the vicinity of the set point SP is continuously output. The stabilization phase starts from the time t3 at which the controlled variable reaches the situation designated in advance. In the stabilization phase, a manipulated variable MV with which the controlled variable PV stabilizes at the set point SP is continuously output.

Figure 2:
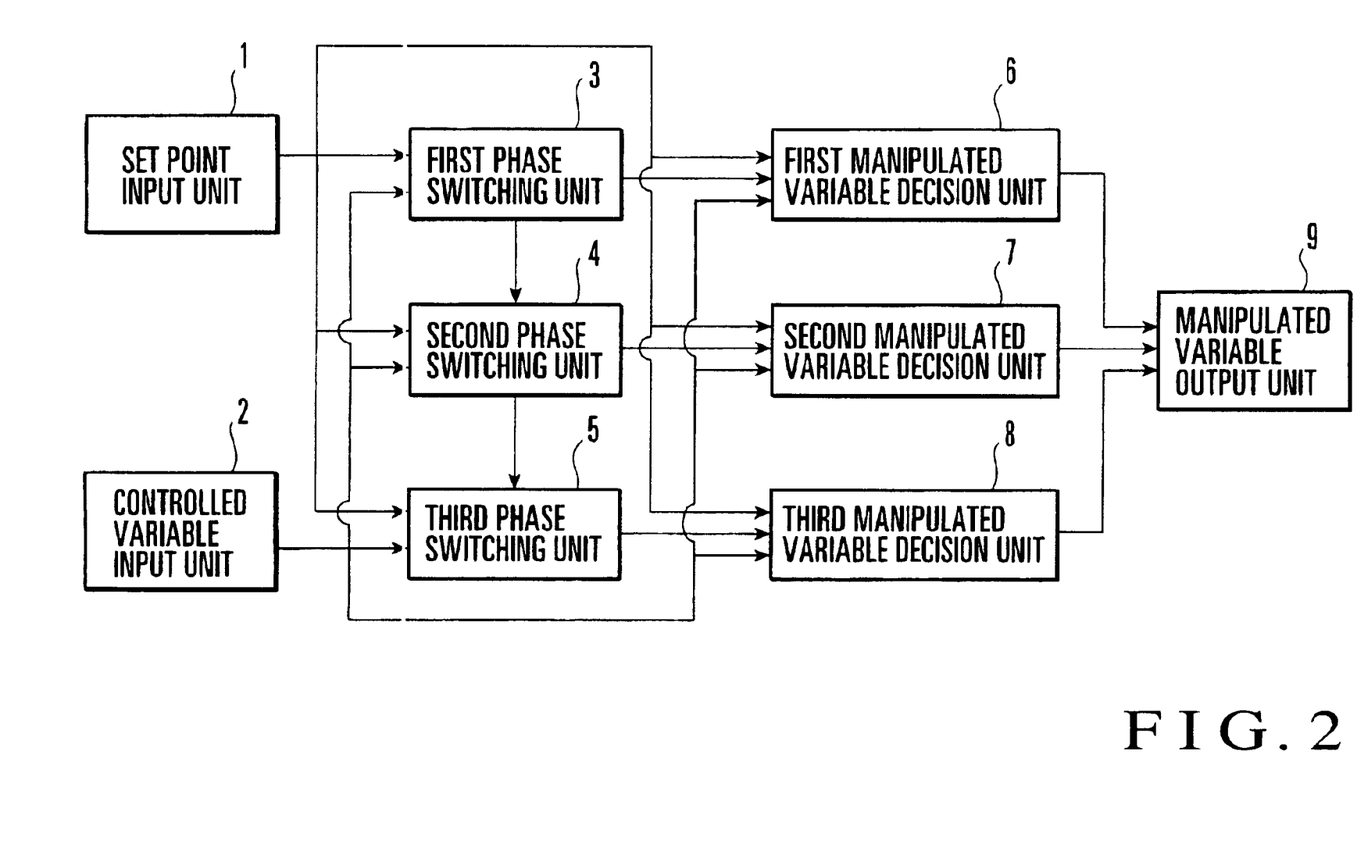
FIG. 2 is a block diagram showing the arrangement of a feedback control apparatus according to the first embodiment of the present invention.

FIG. 2 shows the arrangement of a feedback control apparatus according to the first embodiment of the present invention. The feedback control apparatus of the first embodiment comprises a set point input unit 1 which inputs a set point SP set by the operator of the control apparatus, a controlled variable input unit 2 which inputs a controlled variable PV detected by a sensor (not shown), a first phase switching unit 3 which performs switching to the tracking phase at the tracking phase start time t1 as set point change start time, a second phase switching unit 4 which performs switching to the convergence phase at, as the convergence phase start time t2, the specific set point tracking control elapsed time at which the controlled variable PV does not exceed the set point SP in the tracking phase, a third phase switching unit 5 which performs switching to the stabilization phase at, as the stabilization phase start time t3, the time at which the controlled variable reaches the situation set in advance in the convergence phase, a first manipulated variable decision unit 6 which continuously outputs a manipulated variable MV which causes the controlled variable PV to tracking the set point SP in the tracking phase, a second manipulated variable decision unit 7 which continuously outputs a manipulated variable MV which converges the controlled variable PV to the vicinity of the set point SP in the convergence phase, a third manipulated variable decision unit 8 which continuously outputs a manipulated variable MV which stabilizes the controlled variable PV at the set point SP in the stabilization phase, and a manipulated variable output unit 9 which outputs the manipulated variable MV determined in each phase to an object (not shown) to be controlled.

Figure 3:
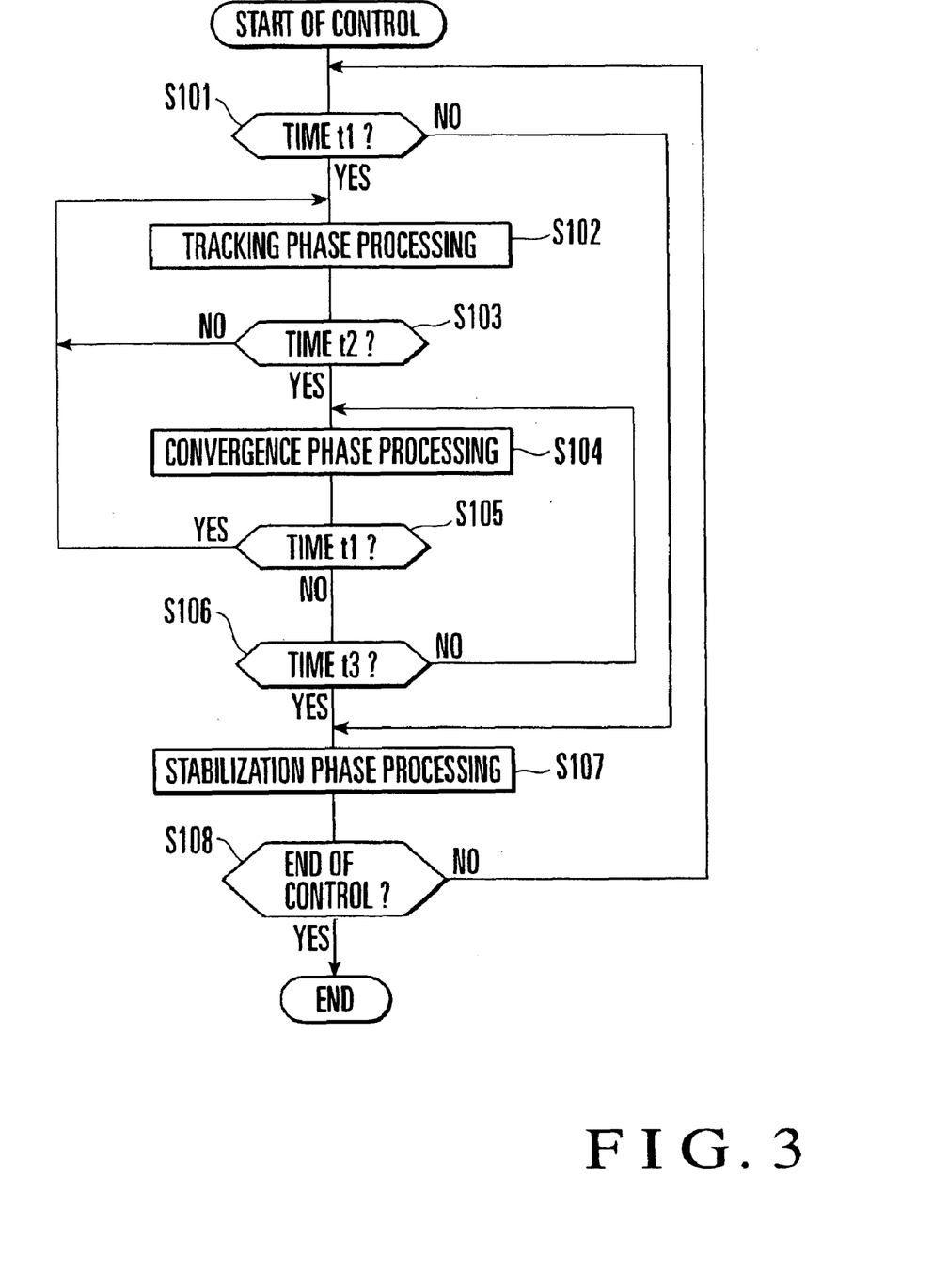
FIG. 3 is a flow chart showing the operation of the feedback control apparatus in FIG. 2.

FIG. 3 shows the operation of the feedback control apparatus in FIG. 2. The set point SP is set by the operator of the control apparatus, and input via the set point input unit 1 to the first phase switching unit 3, second phase switching unit 4, third phase switching unit 5, first manipulated variable decision unit 6, second manipulated variable decision unit 7, and third manipulated variable decision unit 8.

The controlled variable PV for an object to be controlled is detected by a sensor (not shown), and input via the controlled variable input unit 2 to the first phase switching unit 3, second phase switching unit 4, third phase switching unit 5, first manipulated variable decision unit 6, second manipulated variable decision unit 7, and third manipulated variable decision unit 8.

In the initial state, the stabilization phase is selected. More specifically, in response to the start of control, the first phase switching unit 3 checks whether the current time is the tracking phase start time t1 (step S101 in FIG. 3). If NO in step S101, the flow shifts to step S107 to keep the stabilization phase without switching the phase. In the stabilization phase, the third manipulated variable decision unit 8 outputs a specified manipulated variable MV, and the manipulated variable output unit 9 outputs the manipulated variable from the third manipulated variable decision unit 8 to an object to be controlled (step S107).

If YES in step S101, the first phase switching unit 3 switches the stabilization phase to the tracking phase, and notifies the second phase switching unit 4, third phase switching unit 5, and first manipulated variable decision unit 6 that the stabilization phase has been switched to the tracking phase. In the tracking phase, the first manipulated variable decision unit 6 outputs a specified manipulated variable MV. The manipulated variable output unit 9 outputs the manipulated variable from the first manipulated variable decision unit 6 to the object (step S102).

After switching of the tracking phase, the second phase switching unit 4 checks whether the current time is the convergence phase start time t2 (step S103). If NO in step S103, the flow returns to step S102 to keep the tracking phase without switching the phase.

If YES in step S103, the second phase switching unit 4 switches the tracking phase to the convergence phase, and notifies the first phase switching unit 3, third phase switching unit 5, and second manipulated variable decision unit 7 that the tracking phase has been switched to the convergence phase. In the convergence phase, the second manipulated variable decision unit 7 outputs a specified manipulated variable MV. The manipulated variable output unit 9 outputs the manipulated variable from the second manipulated variable decision unit 7 to the object (step S104).

After switching of the convergence phase, the first phase switching unit 3 checks whether the current time is the tracking phase start time t1 (step S105). If YES in step S105, the flow advances to step S102, and the first phase switching unit 3 switches the convergence phase to the tracking phase and notifies the second phase switching unit 4, third phase switching unit 5, and first manipulated variable decision unit 6 that the convergence phase has been switched to the tracking phase. If NO in step S105, the flow advances to step S106, and the first phase switching unit 3 keeps the convergence phase without switching the phase.

The third phase switching unit 5 checks whether the current time is the stabilization phase start time t3 (step S106). If NO in step S106, the flow returns to step S104 to keep the convergence phase without switching the phase.

If YES in step S106, the third phase switching unit 5 switches the convergence phase to the stabilization phase, and notifies the first phase switching unit 3, second phase switching unit 4, and third manipulated variable decision unit 8 that the convergence phase has been switched to the stabilization phase. Processing in step S107 is the same as that described above. These processes in steps S101 to S107 are repeated every control cycle dt until the control apparatus stops in accordance with an instruction from the operator or the like (YES in step S108).

Figure 4:
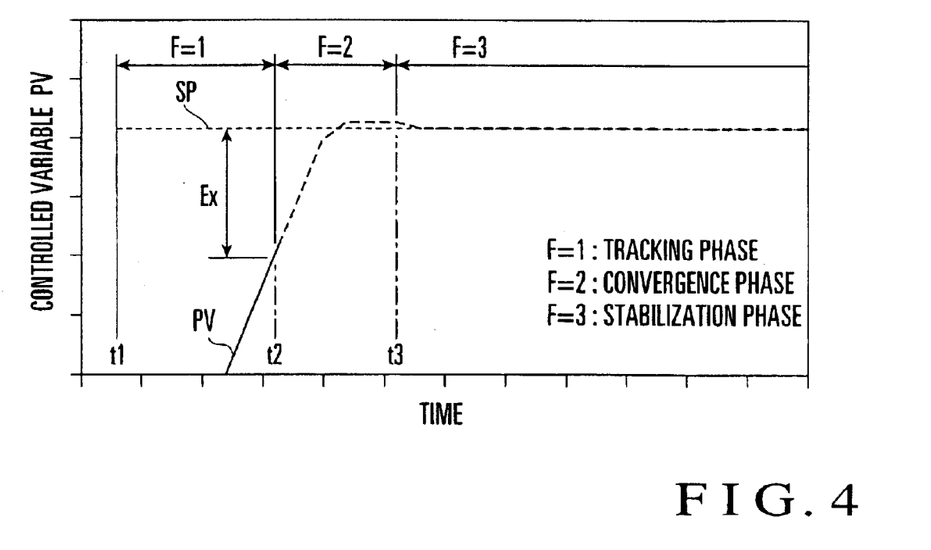
FIG. 4 is a waveform chart for explaining switching from the tracking phase to the convergence phase.
Figure 5:
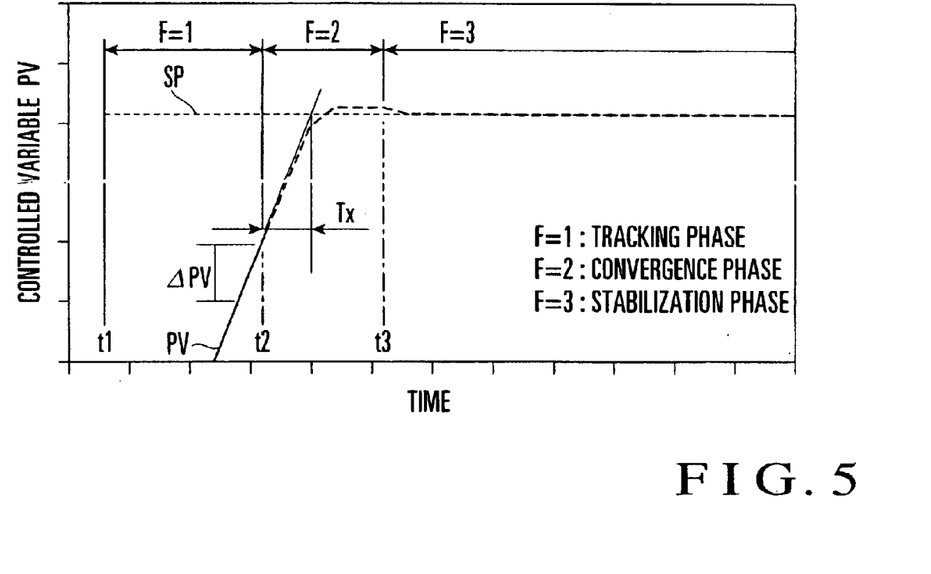
FIG. 5 is a waveform chart for explaining switching from the tracking phase to the convergence phase.

Phase switching will be explained in more detail. FIGS. 4 and 5 show switching from the tracking phase to the convergence phase. There are two methods of determining whether to switch the tracking phase to the convergence phase. According to one determination method, the second phase switching unit 4 determines, as the convergence phase start time (specific set point tracking control elapsed time) t2, the time at which the deviation Er between the set point SP and the controlled variable PV becomes smaller than a preset deviation index Ex. The second phase switching unit 4 then switches the tracking phase to the convergence phase (FIG. 4).

According to the other method, the second phase switching unit 4 calculates a predicted value Tr of a remaining arrival time until the controlled variable PV reaches the set point SP in the current control cycle, by Tr=Er/ΔPV on the basis of the deviation Er between the set point SP and the controlled variable PV and a change rate ΔPV of the controlled variable PV. The second phase switching unit 4 determines, as the convergence phase start time (specific set point tracking control elapsed time) t2, the time at which the calculated remaining arrival time predicted value Tr becomes smaller than the preset time index Tx. The second phase switching unit 4 then switches the tracking phase to the convergence phase (FIG. 5).

Figure 6:
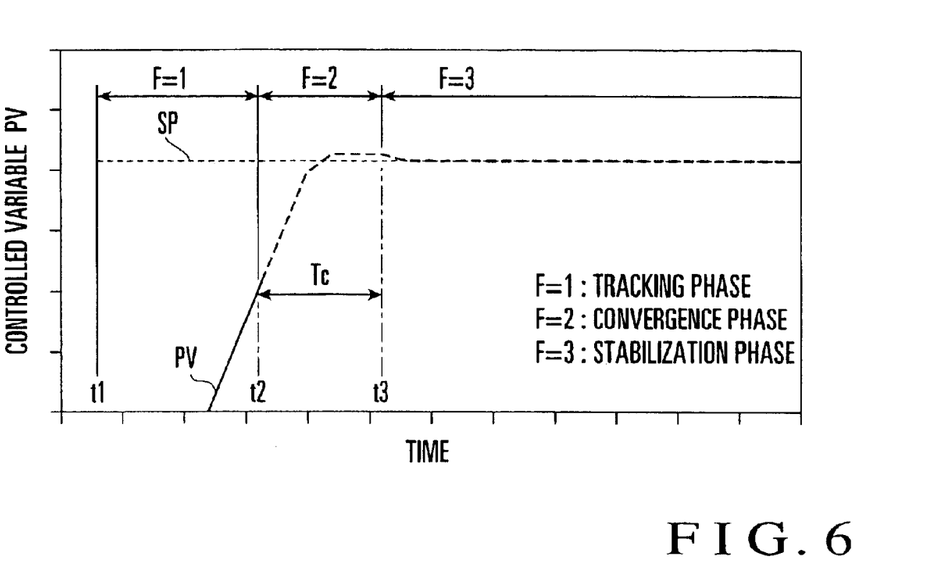
FIG. 6 is a waveform chart for explaining switching from the convergence phase to the stabilization phase.

FIG. 6 shows switching from the convergence phase to the stabilization phase. The third phase switching unit 5 determines the time at which a preset time index Tc has elapsed from the convergence phase start time t2 as the stabilization phase start time (time at which the controlled variable reaches the situation designated in advance) t3. The third phase switching unit 5 then switches the convergence phase to the stabilization phase.

The manipulated variable decision sequence in each phase will be explained. There are three manipulated variable decision sequences in the tracking phase. According to the first sequence, the first manipulated variable decision unit 6 continuously outputs a preset manipulated variable MV1.

Figure 7:
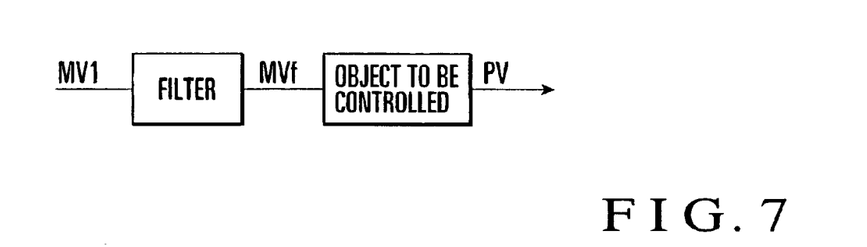
FIG. 7 is a block diagram for explaining a manipulated variable decision sequence in the tracking phase.

According to the second sequence, the first manipulated variable decision unit 6 executes time lag filtering for the preset manipulated variable MV1, and continuously outputs a value MVf after time lag filtering. In the second sequence, the manipulated variable MV1 is filtered through a time lag filter as shown in FIG. 7, and the manipulated variable MVf after time lag filtering is given to an object to be controlled.

Figure 8:
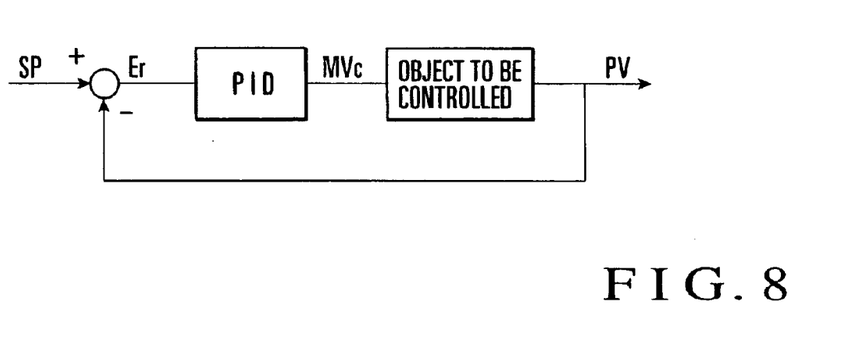
FIG. 8 is a block diagram for explaining the manipulated variable decision sequence in the tracking phase.

According to the third sequence, the first manipulated variable decision unit 6 continuously outputs a manipulated variable MVc calculated by a PID control algorithm (including P control, PD control, and PI control) which puts importance on the quick response of control. In the third sequence, the manipulated variable MVc is calculated from the deviation Er by a PID control system as shown in FIG. 8, and given to an object to be controlled.

In the convergence phase, the second manipulated variable decision unit 7 continuously outputs a preset manipulated variable MV2. In the stabilization phase, the third manipulated variable decision unit 8 continuously outputs a manipulated variable MVd calculated by a PID control algorithm (including P control, PD control, and PI control) which puts importance on the control stability. That is, the third manipulated variable decision unit 8 calculates the manipulated variable MVd from the deviation Er by a PID control system and supplies the manipulated variable MVd to an object to be controlled.

In the present invention, it is important to divide the response process of set point tracking control into three phases (tracking, convergence, and stabilization phases), as described above. For example, when step response control of causing the controlled variable PV to tracking the step change of the set point SP is executed for a highly nonlinear object to be controlled, the average process gain characteristic of the object is greatly different between a stage corresponding to the tracking phase and a stage corresponding to the stabilization phase, as described with reference to FIG. 14.

If the tracking and stabilization phases are controlled by a control method with the same characteristic, this control characteristic may be proper for the tracking phase but improper for the stabilization phase, and vice versa. In high-speed temperature rise in temperature control, the characteristics of the tracking and stabilization phases are quickly switched, and the control response waveform is disturbed before and after switching. That is, not only the control characteristic of either the tracking phase or stabilization phase degrades, but also the control response waveform is also conspicuously disturbed in the intermediate stage between these phases.

In the present invention, the tracking and stabilization phases are controlled by using separate control characteristics. In addition, the present invention adopts the convergence phase for control with still another control characteristic so as not to disturb the control response waveform before and after the switching time between the tracking and stabilization phases.

In the tracking phase, the manipulated variable MV aimed only to cause the controlled variable PV to tracking the set point SP is output. In the convergence phase, the manipulated variable MV aimed only to converge the controlled variable PV to the vicinity of the set point SP in order to shift the phase from the tracking phase to the stabilization phase is output. In the stabilization phase, the manipulated variable MV aimed only to stabilize the controlled variable PV at the set point SP is output.

In the present invention, the control characteristics of the tracking, convergence, and stabilization phases can be separately adjusted, and parameters can be easily adjusted in accordance with an actual object. Particularly in set point tracking control, the response waveform of set point tracking control can be forcibly, directly shaped by adjusting the switching time from the tracking phase to the convergence phase and adjusting the manipulated variable MV in the convergence phase. The present invention can realize smooth set point tracking control.

As the control method capable of separately adjusting the set point tracking characteristic and disturbance suppressing characteristic, PID with two degrees of freedom is proposed. This PID is not based on the concept that the set point tracking characteristic is adjusted for each phase. It should be noted that PID with two degrees of freedom cannot solve the problem which is solved by the present invention. The present invention is characterized by dividing the response process into three phases, and setting the convergence phase in the intermediate stage to smoothly shift the phase.

Figure 9A:
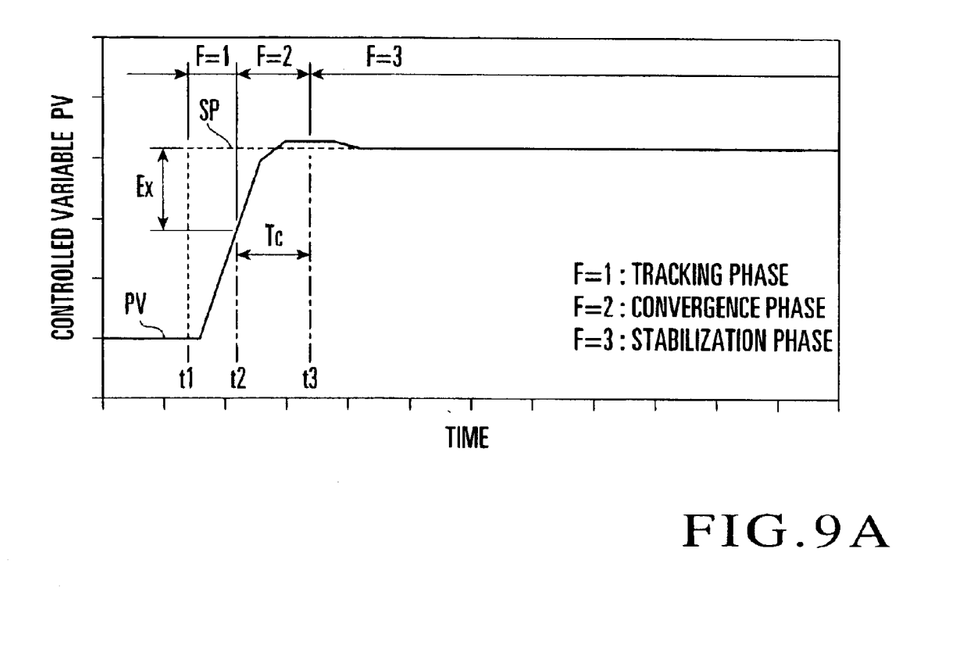
FIGS. 9A and 9B are waveform charts showing the operation of the feedback control apparatus according to the first embodiment of the present invention.
Figure 9B:
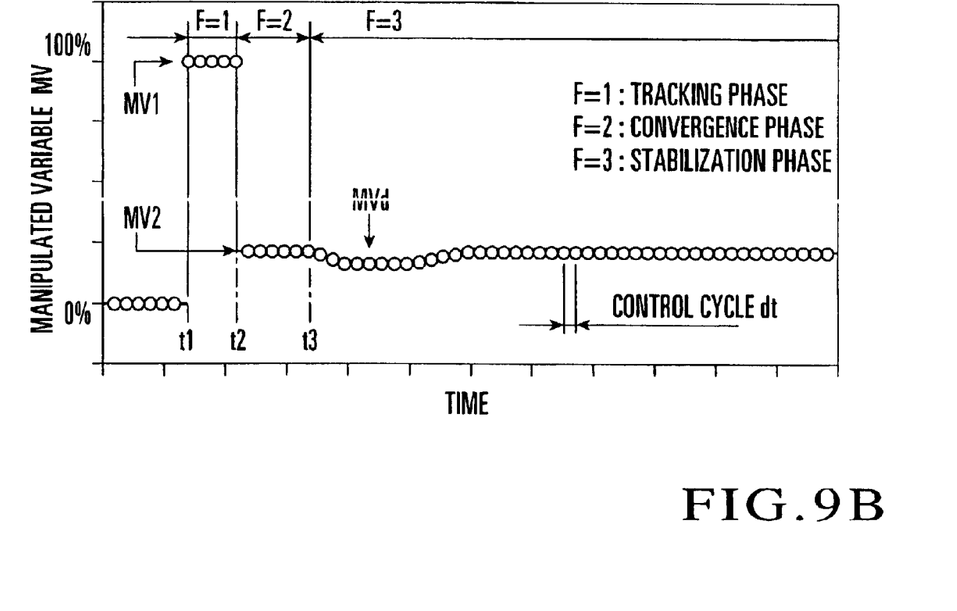

As a detailed operation of the first embodiment, operation when the feedback control apparatus of FIG. 2 is applied to high-speed temperature rise control will be explained. FIGS. 9A and 9B show the operation of the feedback control apparatus according to the first embodiment. FIG. 9A shows the change of the controlled variable PV, and FIG. 9B shows the change of the manipulated variable MV. As described above, the processes in steps S101 to S108 of FIG. 3 are executed every control cycle dt. Hence, the manipulated variable MV is also output every control cycle dt. ○ in FIG. 9B represents the manipulated variable MV output every control cycle dt.

In the first embodiment, the switching time (specific set point tracking control elapsed time) t2 from the tracking phase to the convergence phase is set to the time at which the deviation Er between the set point SP and the controlled variable PV becomes smaller than the preset deviation index Ex. The switching time (time at which the controlled variable reaches the situation designated in advance) t3 from the convergence phase to the stabilization phase is set to the time upon the lapse of the preset time index Tc.

In the first embodiment, the decision sequence of the tracking phase manipulated variable MV is to continuously output the preset manipulated variable MV1. The decision sequence of the convergence phase manipulated variable MV is to continuously output the preset manipulated variable MV2. The decision sequence of the stabilization phase manipulated variable MV is to continuously output the manipulated variable MVd calculated by the PID control algorithm.

In the first embodiment, letting F be the parameter representing the phase, the phase is the tracking phase for F=1, the convergence phase for F=2, and the stabilization phase for F=3. Further, let SP(n) be the set point in the current control cycle n, PV(n) be the controlled variable in the control cycle n, MV(n) be the manipulated variable in the control cycle n, and Er(n) be the control deviation in the control cycle n.

In step S101 or S105 of FIG. 3, the first phase switching unit 3 determines that the current time is the tracking phase start time t1 if the set point SP(n) in the current control cycle n is changed to a higher-temperature side than the set point SP(n−1) of a preceding control cycle. The first phase switching unit 3 changes the parameter F representing the phase to F=1 (tracking phase), and notifies the second phase switching unit 4, third phase switching unit 5, and first manipulated variable decision unit 6 of F=1. That is, the first phase switching unit 3 performs the following processing:

$$\text{if } SP(n) > SP(n-1) \text{ then } F \leftarrow 1 \quad (1)$$

If the first phase switching unit 3 is notified of F=2 or F=3 from the second phase switching unit 4 or third phase switching unit 5, the first phase switching unit 3 changes the parameter F output to the first manipulated variable decision unit 6 to the notified value F=2 or F=3.

In the first embodiment, the phase is switched to the tracking phase when SP(n)>SP(n−1) is established because of temperature rise control. Alternatively, the phase may be switched to the tracking phase when the set point SP(n) becomes smaller than the set point SP(n−1) of a preceding control cycle (SP(n)<SP(n−1)).

The manipulated variable output value MV1 in the tracking phase is set in advance in the first manipulated variable decision unit 6. The manipulated variable output value MV1 is set such that the controlled variable PV tracks the set point SP with a desired tracking characteristic. When the present invention is applied to high-speed temperature rise control, MV1=100% is proper.

If the parameter F output from the first phase switching unit 3 is F=1, the first manipulated variable decision unit 6 outputs the preset value MV1 as the manipulated variable MV(n) (step S102 of FIG. 3 and FIG. 9B). That is, the first manipulated variable decision unit 6 performs the following processing:

$$\text{if } F=1 \text{ then } MV(n) \leftarrow MV1 \quad (2)$$

The second phase switching unit 4 calculates the deviation Er(n) between the set point SP(n) and the controlled variable PV(n) in the current control cycle n:

$$Er(n) = SP(n) - PV(n) \quad (3)$$

The deviation index Ex for determining phase switching is set in advance in the second phase switching unit 4. If the parameter F is F=1 in step S103 of FIG. 3, the set point SP(n) is not changed from the set point SP(n−1), and the deviation Er(n) is smaller than the deviation index Ex, the second phase switching unit 4 determines that the current time is the convergence phase start time t2. The second phase switching unit 4 changes the parameter F to F=2 (convergence phase), and outputs F=2 to the first phase switching unit 3, third phase switching unit 5, and second manipulated variable decision unit 7. That is, the second phase switching unit 4 performs the following processing:

$$\text{if } F=1 \text{ and } SP(n)=SP(n-1) \text{ and } Er(n)<Ex \text{ then } F\leftarrow 2 \qquad (4)$$

Figure 10:
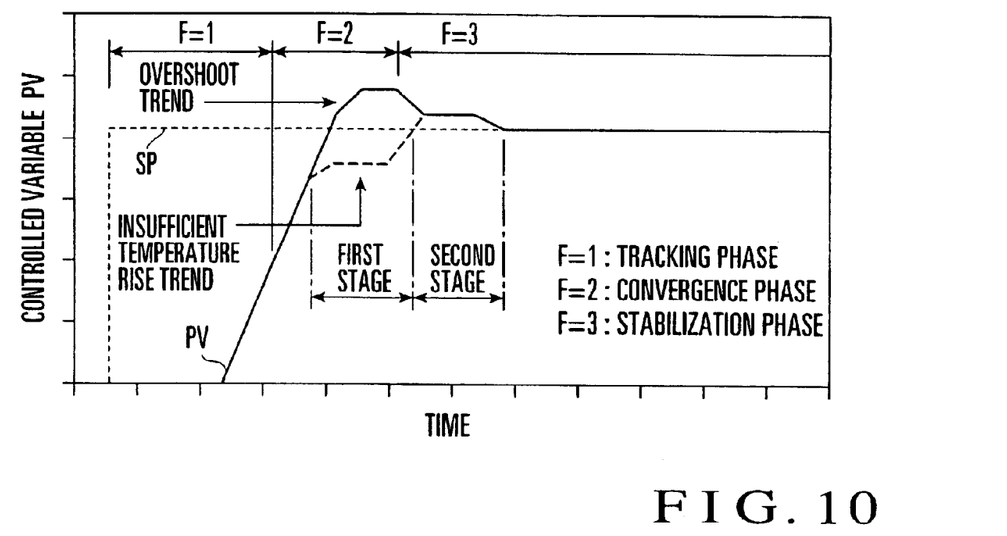
FIG. 10 is a waveform chart for explaining a deviation index adjustment method according to the first embodiment of the present invention.

The deviation index Ex is adjusted by trial and error such that the phase shifts from the tracking phase to the convergence phase at a proper timing, i.e., the controlled variable PV tracks the set point SP with a desired tracking characteristic (response waveform). When the present invention is applied to high-speed temperature rise control, the overshoot trend or insufficient temperature rise trend appears in two stages, as shown in FIG. 10. Adjustment of the deviation index Ex gives attention to the first stage. The deviation index Ex is corrected to a large value when overshoot occurs, or to a small value when the temperature rise is insufficient. The deviation index Ex is a numeral value which forcibly, directly shapes the response waveform of set point tracking control. An appropriate value can be easily obtained by trial and error.

If the second phase switching unit 4 is notified of F=1 or F=3 from the first phase switching unit 3 or third phase switching unit 5, the second phase switching unit 4 changes the parameter F output to the second manipulated variable decision unit 7 to the notified value F=1 or F=3.

The manipulated variable output value MV2 in the convergence phase is set in advance in the second manipulated variable decision unit 7. If the parameter F output from the second phase switching unit 4 is F=2, the second manipulated variable decision unit 7 outputs the preset value MV2 as the manipulated variable MV(n) (step S104 of FIG. 3 and FIG. 9B). That is, the second manipulated variable decision unit 7 performs the following processing:

$$\text{if } F=2 \text{ then } MV(n)\leftarrow MV2 \qquad (5)$$

Figure 11:
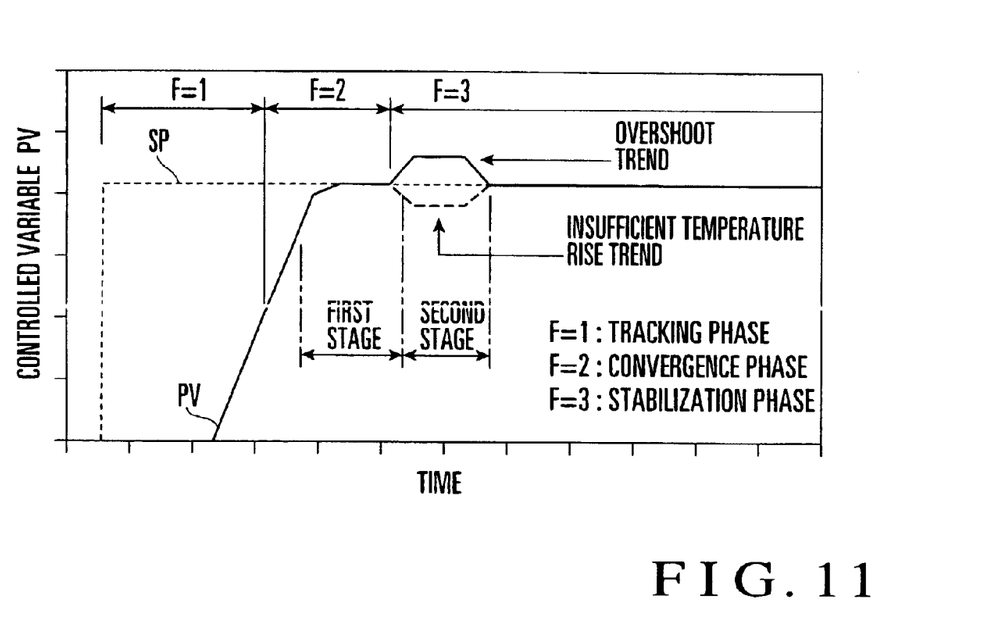
FIG. 11 is a waveform chart for explaining the manipulated variable output value adjustment method of the second manipulated variable decision unit according to the first embodiment of the present invention.

The manipulated variable output value MV2 is adjusted by trial and error such that the controlled variable PV converts to the set point SP with a desired characteristic. When the present invention is applied to high-speed temperature rise control, the overshoot trend or insufficient temperature rise trend appears in two stages, as shown in FIG. 11. Adjustment of the manipulated variable output value MV2 gives attention to the second stage. The manipulated variable output value MV2 is corrected to a small value when overshoot occurs, or to a large value when the temperature rise is insufficient. The manipulated variable output value MV2 is a numeral value which forcibly, directly shapes the response waveform of set point tracking control. An appropriate value can be easily obtained by trial and error.

The time index Tc for determining phase switching is set in advance in the third phase switching unit 5. If the parameter F is F=2 in step S106 of FIG. 3, and a lapsed time tn from the time t2 at which F=2 (convergence phase) is set is longer than the time index Tc, the third phase switching unit 5 determines that the current time is the stabilization phase start time t3. The third phase switching unit 5 changes the parameter F to F=3 (stabilization phase), and outputs F=3 to the first phase switching unit 3, second phase switching unit 4, and third manipulated variable decision unit 8. That is, the third phase switching unit 5 performs the following processing:

$$\text{if } F=2 \text{ and } tn>Tc \text{ then } F\leftarrow 3 \qquad (6)$$

The time index Tc is adjusted by trial and error such that the controlled variable PV converts to the set point SP with a desired characteristic. When the present invention is applied to high-speed temperature rise control, the time index Tc is appropriately a time about one to two times an idle process time Lp of an object to be controlled. If the third phase switching unit 5 is notified of F=1 or F=2 from the first phase switching unit 3 or second phase switching unit 4, the third phase switching unit 5 changes the parameter F output to the third manipulated variable decision unit 8 to the notified value F=1 or F=2.

If the parameter F output from the third phase switching unit 5 is F=3, the third manipulated variable decision unit 8 outputs, as the manipulated variable MV(n), the manipulated variable MVd(n) calculated by the PID control algorithm which puts importance on the control stability (step S107 of FIG. 3 and FIG. 9B). That is, the third manipulated variable decision unit 8 performs the following processing:

$$\text{if } F=3 \text{ then } MV(n)\leftarrow MVd(n) \qquad (7)$$

The PID control algorithm which puts importance on the control stability is given by the following transfer function using a Laplace operator s:

$$MVd(n)=Kg3\{1+(1/Ti3s)+Td3s\}\{Sp(n)-PV(n)\} \qquad (8)$$

where Kg3 is the proportional gain, Ti3 is the integral time, and Td3 is the derivative time. Note that a method of setting the stability-oriented parameters Kg3, Ti3, and Td3 is well known, and a description thereof will be omitted.

[Second Embodiment]

Figure 12A:
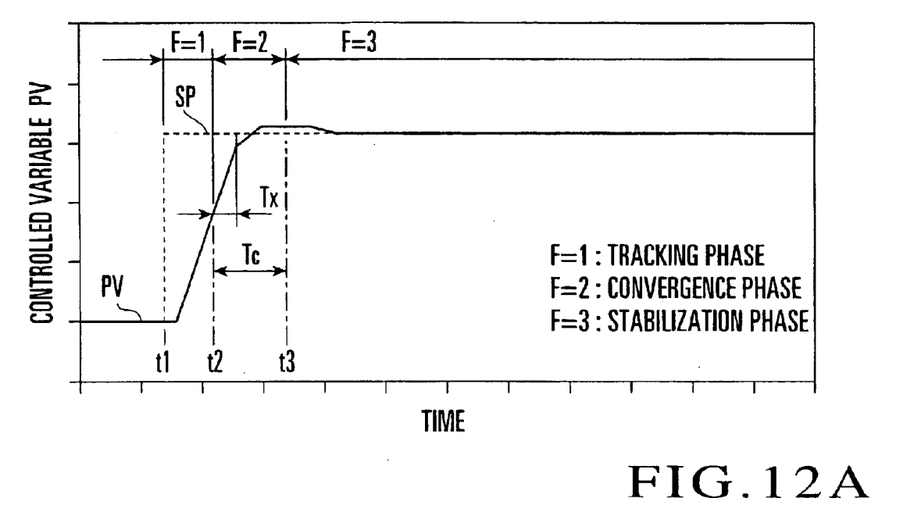
FIGS. 12A and 12B are waveform charts showing the operation of a feedback control apparatus according to the second embodiment of the present invention.
Figure 12B:
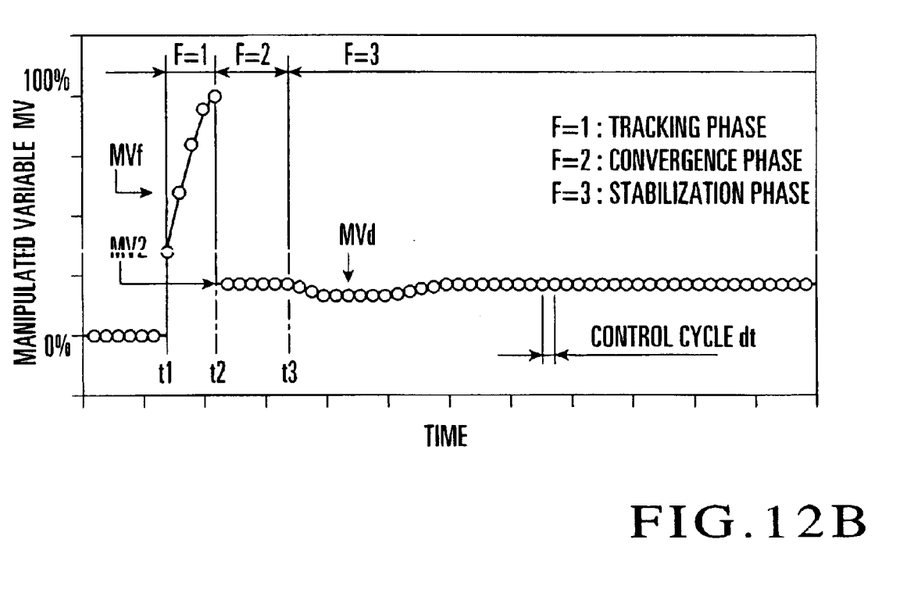

The second embodiment of the present invention will be described. The second embodiment is directed to another application to high-speed temperature rise control. Also in the second embodiment, the arrangement and processing flow of a feedback control apparatus are the same as those in FIGS. 2 and 3, and will be described using the reference numerals in FIGS. 2 and 3. FIGS. 12A and 12B show the operation of the feedback control apparatus according to the second embodiment. FIG. 12A shows the change of the controlled variable PV, and FIG. 12B shows the change of the manipulated variable MV. ○ in FIG. 12B represents the manipulated variable MV output every control cycle dt.

In the second embodiment, the switching time (specific set point tracking control elapsed time) t2 from the tracking phase to the convergence phase is set to the time at which the remaining arrival time predicted value Tr=Er/ΔPV calculated based on the deviation Er between the set point SP and the controlled variable PV and the change rate ΔPV of the controlled variable PV becomes smaller than the preset time index Tx. The switching time (time at which the controlled variable reaches the situation designated in advance) t3 from the convergence phase to the stabilization phase is set to the time upon the lapse of the preset time index Tc.

In the second embodiment, the decision sequence of the tracking phase manipulated variable MV is to perform time lag filtering for the preset manipulated variable MV1 and continuously output the value MV1 after time lag filtering. The decision sequence of the convergence phase manipulated variable MV is to continuously output the preset manipulated variable MV2. The decision sequence of the stabilization phase manipulated variable MV is to continuously output the manipulated variable MVd calculated by the PID control algorithm which puts importance on the control stability.

The operation of a first phase switching unit 3 is the same as that in the first embodiment. The manipulated variable output value MV1 and a first-order lag filter time constant Tf in the tracking phase are set in advance in a first manipulated variable decision unit 6. If the parameter F output from the first phase switching unit 3 is F=1, the first manipulated variable decision unit 6 performs first-order lag filtering for the preset value MV1, and outputs the value MVf(n) after first-order lag filtering as the manipulated variable MV(n) (step S102 of FIG. 3 and FIG. 12B). That is, the first manipulated variable decision unit 6 performs the following processing:

$$\text{if } F=1 \text{ then } MV(n) \leftarrow MVf(n) \tag{9}$$

First-order lag filtering is given by the following transfer function using the Laplace operator s:

$$MVf(n)=\{1/(1+Tfs)\}MV1 \tag{10}$$

The first manipulated variable decision unit 6 calculates the value MVf(n) after first-order lag filtering by equation (10).

The manipulated variable output value MV1 is set such that the controlled variable PV tracks the set point SP with a desired tracking characteristic. When the present invention is applied to high-speed temperature rise control, MV1= 100% is proper. The first-order lag filter time constant Tf is arbitrarily set such that the speed at which the controlled variable PV tracks the set point SP is adjusted to a desired speed. When the present invention is applied to high-speed temperature rise control, the temperature rise speed can be adjusted low by setting a large first-order lag filter time constant Tf.

A second phase switching unit 4 calculates the deviation Er(n) between the set point SP(n) and the controlled variable PV(n) in the current control cycle n by equation (3) described above. Further, the second phase switching unit 4 calculates the predicted value Tr(n) of the remaining arrival time until the controlled variable PV(n) reaches the set point SP in the current control cycle:

$$Tr(n)=Er(n)/\Delta PV=Er(n)dt/\{Pv(n)-PV(n-1)\} \tag{11}$$

where dt is the control cycle, and PV(n−1) is the controlled variable of a preceding control cycle.

The time index Tx for determining phase switching is set in advance in the second phase switching unit 4. If the parameter F is F=1 in step S103 of FIG. 3, the set point SP(n) is not changed from the set point SP(n−1), and the remaining arrival time predicted value Tr(n) is smaller than the time index Tx, the second phase switching unit 4 changes the parameter F to F=2 (convergence phase), and outputs F=2 to the first phase switching unit 3, a third phase switching unit 5, and a second manipulated variable decision unit 7. That is, the second phase switching unit 4 performs the following processing:

$$\text{if } F=1 \text{ and } SP(n)=SP(n-1) \text{ and } Tr(n)<Tx \text{ then } F \leftarrow 2 \tag{12}$$

The time index Tx is adjusted by trial and error such that the phase shifts from the tracking phase to the convergence phase at a proper timing, i.e., the controlled variable PV tracks the set point SP with a desired tracking characteristic. When the present invention is applied to high-speed temperature rise control, the overshoot trend or insufficient temperature rise trend appears in two stages, as described with reference to FIG. 10. Adjustment of the time index Tx gives attention to the first stage. The time index Tx is corrected to a large value when overshoot occurs, or to a small value when the temperature rise is insufficient. The time index Tx is a numeral value which forcibly, directly shapes the response waveform of set point tracking control. An appropriate value can be easily obtained by trial and error.

The operations of the second manipulated variable decision unit 7, the third phase switching unit 5, and a third manipulated variable decision unit 8 are the same as those in the first embodiment.

[Third Embodiment]

Figure 13A:
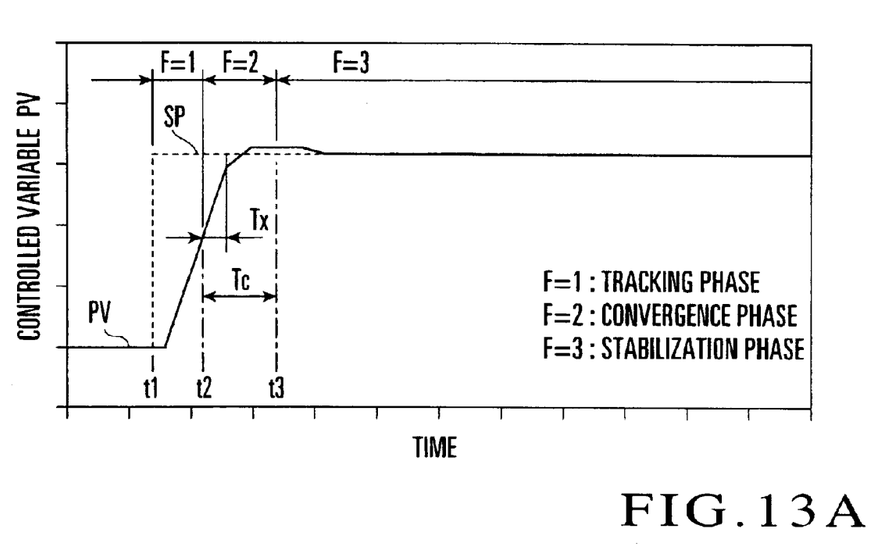
FIGS. 13A and 13B are waveform charts showing the operation of a feedback control apparatus according to the third embodiment of the present invention.
Figure 13B:
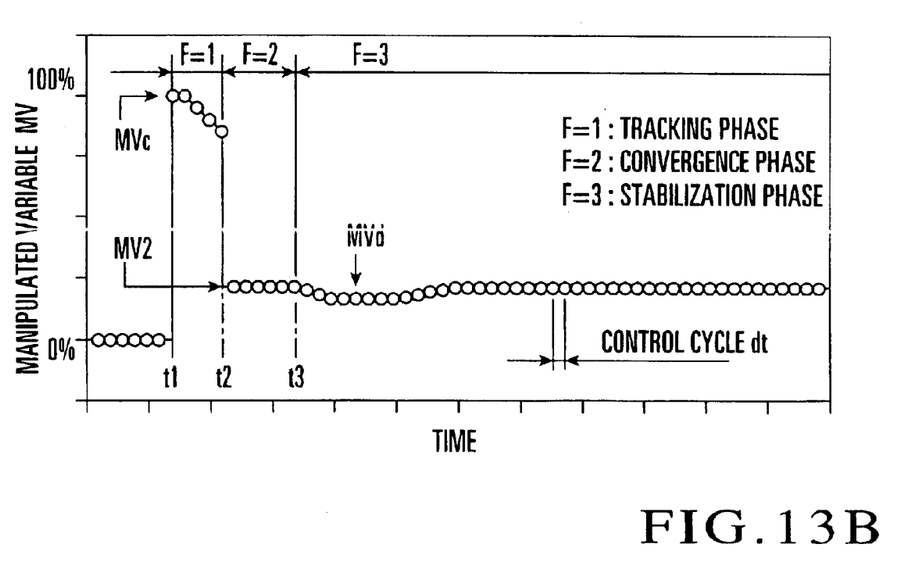

The third embodiment of the present invention will be described. The third embodiment is directed to still another application to high-speed temperature rise control. Also in the third embodiment, the arrangement and processing flow of a feedback control apparatus are the same as those in FIGS. 2 and 3, and will be described using the reference numerals in FIGS. 2 and 3. FIGS. 13A and 13B show the operation of the feedback control apparatus according to the third embodiment. FIG. 13A shows the change of the controlled variable PV, and FIG. 13B shows the change of the manipulated variable MV. ○ in FIG. 13B represents the manipulated variable MV output every control cycle dt.

In the third embodiment, the switching time (specific set point tracking control elapsed time) t2 from the tracking phase to the convergence phase is set to the time at which the remaining arrival time predicted value Tr=Er/ΔPV calculated based on the deviation Er between the set point SP and the controlled variable PV and the change rate ΔPV of the controlled variable PV becomes smaller than the preset time index Tx. The switching time (time at which the controlled variable reaches the situation designated in advance) t3 from the convergence phase to the stabilization phase is set to the time upon the lapse of the preset time index Tc.

In the third embodiment, the decision sequence of the tracking phase manipulated variable MV is to continuously output the manipulated variable MVc calculated by the PID control algorithm which puts importance on the quick response of control. The decision sequence of the convergence phase manipulated variable MV is to continuously output the preset manipulated variable MV2. The decision sequence of the stabilization phase manipulated variable MV is to continuously output the manipulated variable MVd calculated by the PID control algorithm which puts importance on the control stability.

The operation of a first phase switching unit 3 is the same as that in the first embodiment. If the parameter F output from the first phase switching unit 3 is F=1, a first manipulated variable decision unit 6 outputs, as the manipulated variable MV(n), the manipulated variable MVc(n) calculated by the PID control algorithm which puts importance on the quick response of control (step S102 of FIG. 3 and FIG. 13B). That is, the first manipulated variable decision unit 6 performs the following processing:

$$\text{if } F=1 \text{ then } MV(n) \leftarrow MVc(n) \tag{13}$$

The PID control algorithm which puts importance on the quick response of control is given by the following transfer function using the Laplace operator s:

$$MVc(n)=Kg1\{1+(1/Ti1s)+Td1s\}\{Sp(n)-PV(n)\} \tag{14}$$

where Kg1 is the proportional gain, Ti1 is the integral time, and Td1 is the derivative time. Note that a method of setting the quick response-oriented parameters Kg1, Ti1, and Td1 is well known, and a description thereof will be omitted.

The operation of a second phase switching unit 4 is the same as that in the first embodiment. The operations of a second manipulated variable decision unit 7, third phase switching unit 5, and third manipulated variable decision unit 8 are the same as those in the first embodiment.

Note that the present invention is not limited to the above-described embodiments, and each embodiment can be properly modified within the spirit and scope of the present invention. For example, as described in the first embodiment, the present invention can adopt one method of determining whether to switch the stabilization phase to the tracking phase, two methods of determining whether to switch the tracking phase to the convergence phase, one method of determining whether to switch the convergence phase to the stabilization phase, three tracking phase manipulated variable decision sequences, one convergence phase manipulated variable decision sequence, and one stabilization phase manipulated variable decision sequence. There are 1×2×1×3×1×1=6 combinations of the determination methods and manipulated variable decision sequences. The present invention can employ any combination.

According to the third sequence (third embodiment) among the tracking phase manipulated variable decision sequences, the first manipulated variable decision unit 6 continuously outputs the manipulated variable MVc calculated by the PID control algorithm which puts importance on the quick response of control. The present invention is not limited to this, and control which puts important on the quick response may be performed using another control algorithm such as IMC (Internal Model Control).

Similarly, in the stabilization phase, the third manipulated variable decision unit 8 continuously outputs the manipulated variable MVd calculated by the PID control algorithm which puts importance on the control stability. The present invention is not limited to this, and control which puts important on the stability may be performed using another control algorithm.

According to the present invention, the response process of set point tracking control is divided into three, tracking, convergence, and stabilization phases. The set point change start time is set as the tracking phase start time. The specific set point tracking control elapsed time at which the controlled variable does not exceed the set point in the tracking phase is set as the convergence phase start time. The time at which the controlled variable reaches a preset situation in the convergence phase is set as the stabilization phase start time. In response to these start times, the phases are switched. In the tracking phase, a manipulated variable which causes the controlled variable to tracking the set point is output. In the convergence phase, a manipulated variable which converges the controlled variable to the vicinity of the set point is output. In the stabilization phase, a manipulated variable which stabilizes the controlled variable at the set point is output. The control characteristics of the tracking, convergence, and stabilization phases can be separately adjusted, and parameters can be easily adjusted in accordance with an actual object. In particular, the response waveform of set point tracking control can be forcibly, directly shaped by adjusting the switching time from the tracking phase to the convergence phase and adjusting the manipulated variable MV in the convergence phase. The present invention can realize appropriate set point tracking control even for a highly nonlinear object to be controlled. When the control calculation count is insufficient in an advanced adaptive control theory such as SAC, the present invention can realize proper set point tracking control even in, e.g., high-speed temperature rise.

What is claimed is:

1. A feedback control method of giving a manipulated variable to an object to be controlled so as to make a controlled variable tracking a set point, and performing the set point tracking control, comprising:

dividing a response process of set point tracking control into three, tracking, convergence, and stabilization phases; and executing a first phase switching procedure of switching a phase to the tracking phase at set point change start time as start time of the tracking phase, a tracking phase manipulated variable decision procedure of continuously outputting the manipulated variable which causes the controlled variable to tracking the set point in the tracking phase, a second phase switching procedure of switching the phase to the convergence phase at, as start time of the convergence phase, specific set point tracking control elapsed time at which the controlled variable does not exceed the set point in the tracking phase, a convergence phase manipulated variable decision procedure of continuously outputting a manipulated variable which converges the controlled variable to the vicinity of the set point in the convergence phase, a third phase switching procedure of switching the phase to the stabilization phase at, as start time of the stabilization phase, time at which the controlled variable reaches a preset situation in the convergence phase, and a stabilization phase manipulated variable decision procedure of continuously outputting a manipulated variable which stabilizes the controlled variable at the set point in the stabilization phase.

2. A method according to claim 1, wherein in the second phase switching procedure, time at which a deviation between the set point and the controlled variable becomes smaller than a preset deviation index in the tracking phase is set as the start time of the convergence phase.

3. A method according to claim 1, wherein in the second phase switching procedure, a predicted value of a remaining arrival time until the current controlled variable reaches the set point in the tracking phase is calculated on the basis of a deviation between the set point and the controlled variable and a change rate of the controlled variable, and time at which the calculated remaining arrival time predicted value becomes smaller than a preset time index is set as the start time of the convergence phase.

4. A method according to claim 1, wherein in the third phase switching procedure, time at which a preset time index has elapsed from the start time of the convergence phase is set as the start time of the stabilization phase.

5. A method according to claim 1, wherein in the tracking phase manipulated variable decision procedure, a preset manipulated variable is continuously output.

6. A method according to claim 1, wherein in the tracking phase manipulated variable decision procedure, time lag filtering is performed for a preset manipulated variable, and the manipulated variable after time lag filtering is continuously output.

7. A method according to claim 1, wherein in the tracking phase manipulated variable decision procedure, a manipulated variable calculated by a control algorithm which puts importance on quick response of control is continuously output.

8. A method according to claim 1, wherein in the convergence phase manipulated variable decision procedure, a preset manipulated variable is continuously output.

9. A method according to claim 1, wherein in the stabilization phase manipulated variable decision procedure, a manipulated variable calculated by a control algorithm which puts importance on control stability is continuously output.

10. A feedback control apparatus which divides a response process of set point tracking control into three, tracking, convergence, and stabilization phases, gives a manipulated variable to an object to be controlled so as to make a controlled variable tracking a set point, and performs the set point tracking control, comprising:
- a first phase switching unit which switches a phase to the tracking phase at set point change start time as start time of the tracking phase;
- a second phase switching unit which switches the phase to the convergence phase at, as start time of the convergence phase, specific set point tracking control elapsed time at which the controlled variable does not exceed the set point in the tracking phase;
- a third phase switching unit which switches the phase to the stabilization phase at, as start time of the stabilization phase, time at which the controlled variable reaches a preset situation in the convergence phase;
- a first manipulated variable decision unit which continuously outputs a manipulated variable which causes the controlled variable to tracking the set point in the tracking phase;
- a second manipulated variable decision unit which continuously outputs a manipulated variable which converges the controlled variable to the vicinity of the set point in the convergence phase; and
- a third manipulated variable decision unit which continuously outputs a manipulated variable which stabilizes the controlled variable at the set point in the stabilization phase.

11. An apparatus according to claim 10, wherein said second phase switching unit sets, as the start time of the convergence phase, time at which a deviation between the set point and the controlled variable becomes smaller than a preset deviation index in the tracking phase.

12. An apparatus according to claim 10, wherein said second phase switching unit calculates, on the basis of a deviation between the set point and the controlled variable and a change rate of the controlled variable, a predicted value of a remaining arrival time until the current controlled variable reaches the set point in the tracking phase, and sets, as the start time of the convergence phase, time at which the calculated remaining arrival time predicted value becomes smaller than a preset time index.

13. An apparatus according to claim 10, wherein said third phase switching unit sets, as the start time of the stabilization phase, time at which a preset time index has elapsed from the start time of the convergence phase.

14. An apparatus according to claim 10, wherein said first manipulated variable decision unit continuously outputs a preset manipulated variable.

15. An apparatus according to claim 10, wherein said first manipulated variable decision unit performs time lag filtering for a preset manipulated variable, and continuously outputs the manipulated variable after time lag filtering.

16. An apparatus according to claim 10, wherein said first manipulated variable decision unit continuously outputs a manipulated variable calculated by a control algorithm which puts importance on quick response of control.

17. An apparatus according to claim 10, wherein said second manipulated variable decision unit continuously outputs a preset manipulated variable.

18. An apparatus according to claim 10, wherein said third manipulated variable decision unit continuously outputs a manipulated variable calculated by a control algorithm which puts importance on control stability.

* * * * *